United States Patent
Arikai et al.

(10) Patent No.: US 9,187,132 B2
(45) Date of Patent: Nov. 17, 2015

(54) SURROUNDING STRUCTURE OF DOOR HOLDING MECHANISM

(71) Applicant: Suzuki Motor Corporation, Shizuoka-ken (JP)

(72) Inventors: Hideki Arikai, Shizuoka-ken (JP); Kentaro Jojiki, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 242 days.

(21) Appl. No.: 13/847,738

(22) Filed: Mar. 20, 2013

(65) Prior Publication Data

US 2013/0278022 A1 Oct. 24, 2013

(30) Foreign Application Priority Data

Apr. 19, 2012 (JP) ................. 2012-095533

(51) Int. Cl.
*B62D 25/04* (2006.01)
*E05D 15/10* (2006.01)

(52) U.S. Cl.
CPC ........ *B62D 25/04* (2013.01); *E05D 2015/1026* (2013.01)

(58) Field of Classification Search
CPC ............. B60J 5/04; B60J 5/047; B60J 5/049; B60J 5/06; B62D 25/02; B62D 25/04; E05D 2015/1026; E05Y 2900/531
See application file for complete search history.

(56) References Cited

U.S. PATENT DOCUMENTS 4,294,487 A * 10/1981 Nakamura ............... 296/203.03
4,464,863 A * 8/1984 Chikaraishi et al. ............ 49/213

(Continued)

FOREIGN PATENT DOCUMENTS

CN 101456344 A 6/2009
DE 102012004376 * 9/2013 ............. B23K 26/24

(Continued)

OTHER PUBLICATIONS

Chinese Office Action for Application No. 201310139157.8 dated Feb. 28, 2015.

*Primary Examiner* — Glenn Dayoan
*Assistant Examiner* — Paul Chenevert
(74) *Attorney, Agent, or Firm* — Lerner, David, Littenberg, Krumholz & Mentlik, LLP

(57) ABSTRACT

To increase joint strength of a reinforcement member around a door holding mechanism as well as rigidity around the door holding mechanism, a surrounding structure of a door holding mechanism includes: an outer panel forming a pillar together with an inner panel; a sliding door opening and closing by sliding forward and rearward in a location rearward of the pillar; a door holding mechanism holding a rear end portion of the sliding door in a door closing condition; and a pillar forming area of the outer panel having a substantially crank-shaped form in a cross section, wherein the door holding mechanism is attached to a front face of an intermediate portion of the pillar forming area arranged along the vehicle width direction, a pillar reinforcement is arranged between the outer panel and the inner panel, the pillar reinforcement includes front and rear portions, the front portion is overlapped with a rear face of the intermediate portion of the pillar forming area, the rear portion extending rearward from a lateral end, in the vehicle width direction, of the front portion, the rear portion has a substantially crank-shaped form in a middle part thereof in a longitudinal direction thereof, the pillar forming area and the pillar reinforcement form a closed section, and a rear end of the pillar reinforcement is joined to the outer panel.

9 Claims, 5 Drawing Sheets

(56) References Cited

U.S. PATENT DOCUMENTS

| | | | |
|---|---|---|---|
| 4,717,197 A * | 1/1988 | Harasaki | 296/193.05 |
| 4,950,025 A * | 8/1990 | Yoshii | 296/203.04 |
| 5,370,438 A * | 12/1994 | Mori et al. | 296/203.02 |
| 5,800,008 A * | 9/1998 | Gondo | 280/751 |
| 5,938,275 A * | 8/1999 | Kleinhans et al. | 296/203.03 |
| 2002/0167198 A1* | 11/2002 | Cheong | 296/203.02 |
| 2005/0212333 A1 | 9/2005 | Mally et al. | |
| 2008/0007093 A1* | 1/2008 | Andou et al. | 296/193.08 |
| 2008/0007095 A1* | 1/2008 | Wolkersdorfer | 296/203.04 |
| 2009/0102233 A1* | 4/2009 | Tomozawa | 296/187.02 |
| 2011/0127801 A1* | 6/2011 | Mackenzie et al. | 296/193.06 |
| 2012/0228897 A1* | 9/2012 | Anderson et al. | 296/146.6 |
| 2012/0286526 A1* | 11/2012 | Rozario et al. | 292/341.15 |
| 2013/0193718 A1* | 8/2013 | Stanik et al. | 296/203.03 |
| 2013/0278017 A1* | 10/2013 | Arikai et al. | 296/193.06 |
| 2015/0001881 A1* | 1/2015 | Tsutsumi et al. | 296/187.05 |

FOREIGN PATENT DOCUMENTS

| | | | | |
|---|---|---|---|---|
| JP | 05085404 | 4/1993 | | |
| JP | 08332975 | 12/1996 | | |
| JP | 09030261 | 2/1997 | | |
| JP | 2003175859 A | 6/2003 | | |
| JP | 2007112355 A | 5/2007 | | |
| JP | 2010083167 A | 4/2010 | | |
| WO | WO 2010066974 A1 * | 6/2010 | | B62D 27/02 |
| WO | WO 2013179415 A1 * | 12/2013 | | B62D 25/06 |

* cited by examiner

SURROUNDING STRUCTURE OF DOOR HOLDING MECHANISM

CROSS-REFERENCE TO RELATED APPLICATIONS

The present application claims priority from JP 2012-095533 filed Apr. 19, 2012, the disclosure of which is hereby incorporated herein by reference.

The present invention relates to a surrounding structure of a door holding mechanism configured to hold a sliding door in a closing condition.

BACKGROUND OF THE INVENTION

In a vehicle such as a one-box car, a sliding door is widely configured as a door used to open and close an entrance provided on a flank of a vehicle body in a vehicle width direction. Such a sliding door is generally configured to slide in a vehicle front and rear direction in a location rearward of a pillar with respect to the vehicle so that opening and closing a doorway serve as the entrance, and furthermore, the pillar is made up of an outer panel and an inner panel. When the sliding door is closed, a door holding mechanism installed in a front portion of the pillar engages with an engaging member installed in a rear end portion of the sliding door, and thereby the sliding door is held. For example, a structure according to Japanese Patent Laid-Open No. 2010-083167 is configured as follows: a center rail configured to guide a sliding door by extending in a vehicle front and rear direction, is mounted on a lateral surface of an outer panel (side panel) in a vehicle width direction, a door holding mechanism (opening prevention bracket) is installed in a front end portion of the center rail located in front portion of a pillar, and when the sliding door is closed, the door holding mechanism holds the sliding door by engaging with an engaging member (filler lid stopper) of a door opening and closing mechanism which is installed in a rear end portion of the sliding door.

However, when forces are applied from outside of the vehicle, surroundings of the door holding mechanism may be deformed by the applied forces, and as a result, the engaging member of the closed sliding door may be disengaged from the door holding mechanism on a vehicle-body side. Consequently, there is demand to increase rigidity around the door holding mechanism. One example of structures which increase rigidity around conventional door holding mechanisms includes a structure according to Japanese Patent Laid-Open No. 2003-175859. In the structure according to Japanese Patent Laid-Open No. 2003-175859, an outer panel and an inner panel extending substantially in an upper and lower direction are formed into a pillar having a hollow section, a striker is mounted on a front face of a front portion of the pillar, and a pillar reinforcement having substantially L-shaped form in a cross section is arranged inside the hollow pillar, wherein a front portion of the pillar reinforcement extends in a vehicle width direction, a rear portion of the pillar reinforcement extends in a straight line from a lateral end, in the vehicle width direction, of the front portion obliquely to an outer side in the vehicle width direction, a front portion of the pillar reinforcement is mounted on a rear face of the front portion of the pillar on which the striker is mounted, and a rear end of the pillar reinforcement is joined to an inside surface of a lateral portion, in the vehicle width direction, of the outer panel, the outer panel extending toward the rear portion of the vehicle from the front face of the pillar.

BRIEF SUMMARY OF THE INVENTION

Here, in the structure according to Patent Literature 2, if a force directed outward from a center side in the vehicle width direction is applied to the striker, a force tending to rotate around a mounting portion at the root of the striker, acts on the pillar reinforcement when viewed from below. At this time, a force acting on the rear end of the pillar reinforcement may not be dispersed sufficiently by structure of the pillar reinforcement itself, and as a result, the joint of the rear end of the pillar reinforcement and a lateral portion of the outer panel may be separated. If the joint of the rear end of rear portion of the pillar reinforcement and lateral portion of the outer panel is separated in this way, the rigidity around the door holding mechanism is reduced. This is a problem.

The present invention has been made in view of the above circumstances, and the present invention has an object to provide a surrounding structure of a door holding mechanism which can increase joint strength of a reinforcement member around the door holding mechanism as well as rigidity around the door holding mechanism.

To solve the above problem, according to one aspect of the present invention, there is provided a surrounding structure of a door holding mechanism including: an outer panel being arranged on an outer side location of a vehicle in a vehicle width direction, the outer panel forming a pillar together with an inner panel; a sliding door configured to open and close by sliding in a vehicle front and rear direction in a location rearward of the pillar; and a door holding mechanism configured to hold a rear end portion of the sliding door in a closing condition of the sliding door; wherein a pillar forming area of the outer panel has a substantially crank-shaped form in a cross section; wherein the door holding mechanism is attached to a front face of intermediate portion of the pillar forming area, the intermediate portion is arranged along the vehicle width direction, a pillar reinforcement is arranged between the outer panel and the inner panel; wherein the pillar reinforcement includes a front portion and a rear portion, the front portion is overlapped with a rear face of the intermediate portion of the pillar forming area, the door holding mechanism is attached to the rear face of the intermediate portion, and the rear portion extends toward rear portion of the vehicle from a lateral end, in the vehicle width direction, of the front portion; wherein the rear portion of the pillar reinforcement has a substantially crank-shaped form in a middle part thereof in a longitudinal direction thereof, the pillar forming area and the pillar reinforcement form a closed section; and wherein a rear end of the pillar reinforcement is joined to the outer panel In the surrounding structure of a door holding mechanism according to one aspect of the present invention, a joint portion in which the outer panel is joined to the rear end of the pillar reinforcement, is arranged in at least one of locations above and below the door holding mechanism.

In the surrounding structure of a door holding mechanism according to one aspect of the present invention, a door holding mechanism reinforcement has a cross section which is formed in a substantially L-shaped form, the door holding mechanism reinforcement is arranged on a rear side part of the front portion of the pillar reinforcement so as to correspond to a mounting portion for the door holding mechanism, and the door holding mechanism reinforcement is spaced away from the inner panel in the vehicle width direction; the pillar reinforcement and the door holding mechanism reinforcement form a closed section which is formed in a substantially quadrangular shape; and a flange has a cross section which is formed in a substantially L-shaped form, and the flange is formed at the rear end of the pillar reinforcement, and the joint portion in which the outer panel is joined to the rear end of the pillar reinforcement, includes a joint part in which the outer panel is joined to the flange.

In the surrounding structure of a door holding mechanism according to one aspect of the present invention, a rail groove is configured to guide sliding movement of the sliding door, the rail groove is depressed from an outer side location in the vehicle width direction toward a center side location in the vehicle width direction, and the rail groove is arranged along the vehicle front and rear direction in a region rearward of the pillar forming area of the outer panel; and the joint portion in which the outer panel is joined to the rear end of the pillar reinforcement, includes a joint part in which the rail groove is joined to the rear end of the pillar reinforcement.

In the surrounding structure of a door holding mechanism according to one aspect of the present invention, a window opening of a side window of the vehicle is arranged rearward of the pillar forming area of the outer panel in the vehicle front and rear direction; and the joint portion in which the outer panel is joined to the rear end of the pillar reinforcement, includes a joint part in which a peripheral portion of the window opening is joined to the rear end of the pillar reinforcement.

The present invention provides the following advantageous effects. The surrounding structure of a door holding mechanism according to one aspect of the present invention includes: an outer panel arranged on an outer side location of a vehicle in a vehicle width direction, the outer panel forming a pillar together with an inner panel; a sliding door configured to open and close by sliding in a vehicle front and rear direction in a location rearward of the pillar; and a door holding mechanism configured to hold a rear end portion of the sliding door in a closing condition of the sliding door; wherein a pillar forming area of the outer panel has a cross section which is formed in a substantially crank-shaped form; wherein the door holding mechanism is attached to a front face of an intermediate portion of the pillar forming area, the intermediate portion is arranged along the vehicle width direction; wherein a pillar reinforcement is arranged between the outer panel and the inner panel; wherein the pillar reinforcement includes a front portion and a rear portion, the front portion is overlapped with a rear face of the intermediate portion of the pillar forming area, the door holding mechanism is attached to the rear face of the intermediate portion, and the rear portion extends toward the rear portion of the vehicle from a lateral end, in the vehicle width direction, of the front portion; wherein the rear portion of the pillar reinforcement has a substantially crank-shaped form in a middle part thereof in a longitudinal direction thereof; wherein the pillar forming area and the pillar reinforcement form a closed section; and wherein a rear end of the pillar reinforcement is joined to the outer panel. Since the rear portion of the pillar reinforcement has a substantially crank-shaped form in the middle part thereof in the longitudinal direction thereof, when a force directed from a center side in the vehicle width direction toward an outer side in the vehicle width direction, is applied to the striker, resistance develops against a force (hereinafter referred to as a "force in a rotation direction") tending to rotate the pillar reinforcement around a mounting portion for the door holding mechanism while being viewed from below, and thus, the force in the rotation direction is scattered. Consequently the force in the rotation direction prevents separation of the joint of the outer panel and the rear end of the pillar reinforcement. This makes it possible to increase joint strength of the reinforcement member around the door holding mechanism as well as rigidity around the door holding mechanism.

In the surrounding structure of a door holding mechanism according to one aspect of the present invention, the joint portion in which the outer panel is joined to the rear end of the pillar reinforcement, is arranged in at least one of locations above and below the door holding mechanism. Thus, the pillar reinforcement deforms in an area stretching from the striker subjected to an external force to the joint of the outer panel and the rear end of the pillar reinforcement, and as a result, a load applied around the door holding mechanism is dispersed effectively. This makes it possible to increase the rigidity around the door holding mechanism.

In the surrounding structure of a door holding mechanism according to one aspect of the present invention, a door holding mechanism reinforcement has a cross section which is formed in a substantially L-shaped form, the door holding mechanism reinforcement is arranged on a rear side part of the front portion of the pillar reinforcement so as to correspond to a mounting portion for the door holding mechanism, and the door holding mechanism reinforcement is spaced away from the inner panel in the vehicle width direction; the pillar reinforcement and the door holding mechanism reinforcement form a closed section which is formed in a substantially quadrangular shape; a flange has a cross section which is formed in a substantially L-shaped form, and the flange is formed at the rear end of the pillar reinforcement; and the joint portion in which the outer panel is joined to the rear end of the pillar reinforcement, includes a joint part in which the outer panel is joined to the flange. This makes it possible to further increase the rigidity around the door holding mechanism. Furthermore, since the door holding mechanism reinforcement is spaced away from the inner panel in the vehicle width direction, rotation of the pillar reinforcement is facilitated so that the force acting on the pillar reinforcement is scattered, and on the other hand, the force acting on the pillar reinforcement is received by the door holding mechanism reinforcement which forms a closed section together with the pillar reinforcement so that it prevents the pillar reinforcement from moving to such a position as to cause the joint of the outer panel and the rear end of the pillar reinforcement to be separated.

In the surrounding structure of a door holding mechanism according to one aspect of the present invention, the rail groove configured to guide sliding movement of the sliding door is depressed from an outer side location in the vehicle width direction toward a center side in the vehicle width direction, and the rail groove is arranged along the vehicle front and rear direction in a region rearward of the pillar forming area of the outer panel, and the joint portion in which the outer panel is joined to the rear end of the pillar reinforcement, includes a joint part in which the rail groove is joined to the rear end of the pillar reinforcement. Thus, the rear end of the pillar reinforcement is joined to the rail groove which has great strength. This makes it possible to increase joint strength of the outer panel and the rear end of the pillar reinforcement.

In the surrounding structure of a door holding mechanism according to one aspect of the present invention, the window opening of a side window is arranged rearward of the pillar forming area of the outer panel, and the joint portion in which the outer panel is joined to the rear end of the pillar reinforcement, includes a joint part in which a peripheral portion of the window opening is joined to the rear end of the pillar reinforcement. Thus, the rear end of the pillar reinforcement is joined to the high-strength peripheral portion of the window opening, in an upper area of a vehicle body. This makes it possible to increase joint strength of the outer panel and the rear end of the pillar reinforcement, in the upper area of the vehicle body.

DETAILED DESCRIPTION

Figure 1:
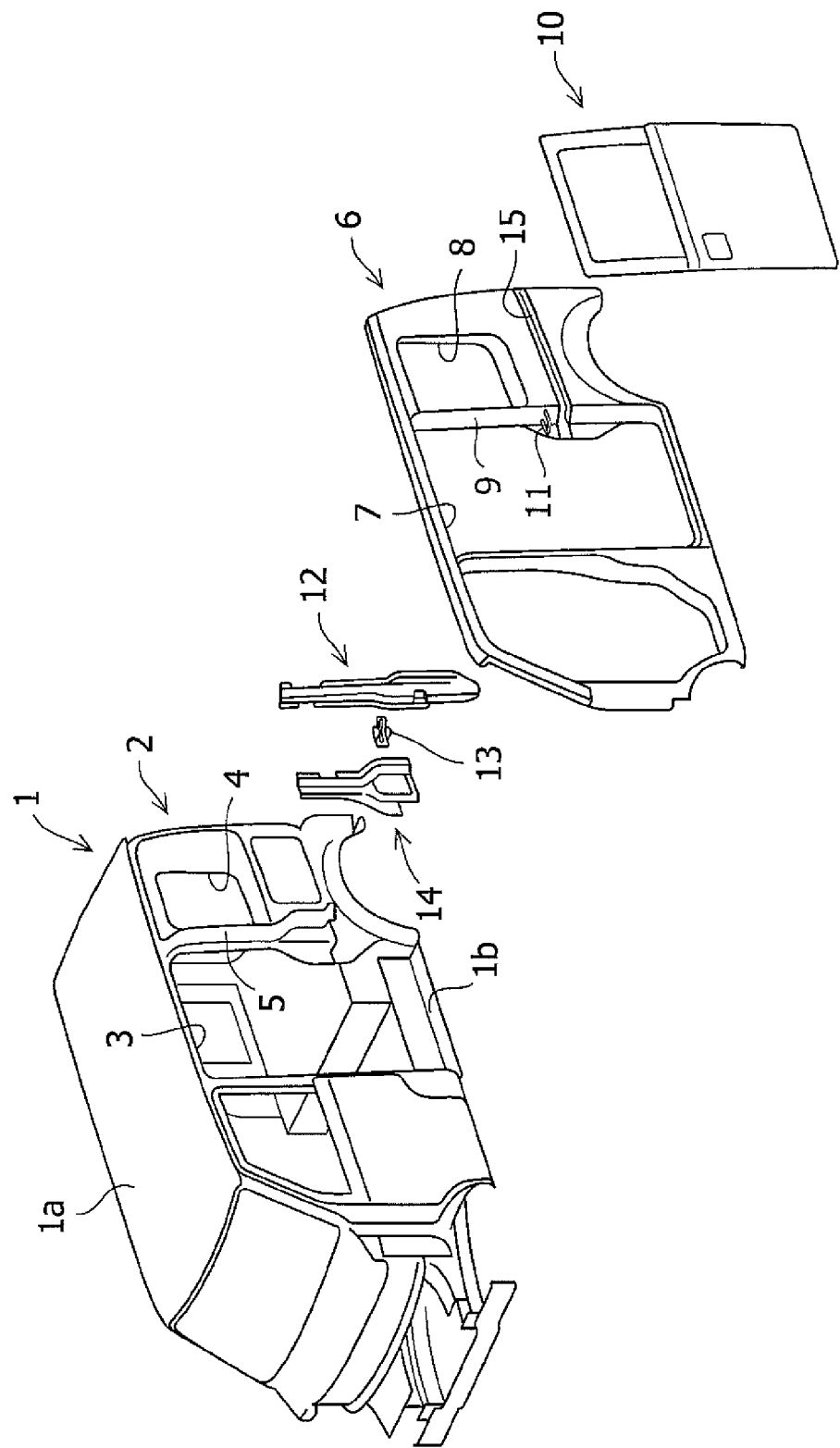
FIG. 1 is an exploded perspective view of a vehicle body including a surrounding structure of a door holding mechanism according to an embodiment of the present invention.

A vehicle body including a surrounding structure of a door holding mechanism according to an embodiment of the present invention will be described. Referring to FIG. 1, a vehicle body 1 is configured for a one-box vehicle. On a flank, in a vehicle width direction, of the vehicle body 1, an inner panel 2 is arranged along a vehicle front and rear direction. In a midsection of the inner panel 2 in the vehicle front and rear direction, a doorway 3 passes through to the other side in the vehicle width direction so as to provide an entrance for passengers. In a location spaced away from the doorway 3 in the inner panel 2 along the vehicle front and rear direction, a window opening 4 is formed in a location rearward of the doorway 3 with respect to the vehicle so as to pass through to the other side in the vehicle width direction, to form a side window. Between the doorway 3 and window opening 4 in the inner panel 2, a pillar forming area 5 is provided along an upper and lower direction to allow a rear pillar to be configured. Furthermore, along the vehicle front and rear direction, an outer panel 6 is arranged on a lateral surface, in the vehicle width direction, of the inner panel 2. In a midsection, in the vehicle front and rear direction, of the outer panel 6, a doorway 7 corresponds to the doorway 3 in the inner panel 2 so as to pass through to the other side in the vehicle width direction. In a location rearward of the doorway 7 with respect to the vehicle, while being spaced away from the doorway 7 in the outer panel 6 along the vehicle front and rear direction, a window opening 8 corresponds to the window opening 4 in the inner panel 2 so as to pass through to the other side in the vehicle width direction. Between the doorway 7 and window opening 8 in the outer panel 6, a pillar forming area 9 is provided along the upper and lower direction so as to correspond to the pillar forming area 5 of the inner panel 2. A sliding door 10 is mounted on the flank, in the vehicle width direction, of the vehicle body 1. A striker 11 is mounted in the pillar forming area 9 of the outer panel 6 so as to serve as a door holding mechanism configured to hold the sliding door 10. A pillar reinforcement 12, a striker reinforcement 13, and an inner panel reinforcement 14 are arranged between the pillar forming area 5 of the inner panel 2 and the pillar forming area 9 of the outer panel 6.

Figure 4:
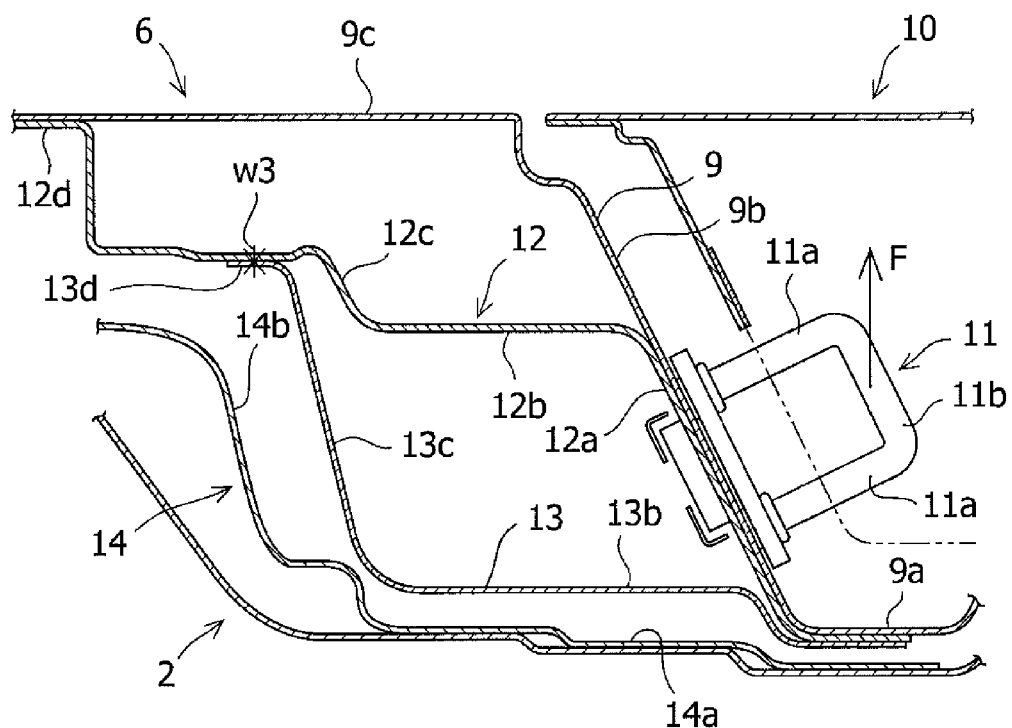
FIG. 4 is a sectional view schematically showing the surrounding structure of a door holding mechanism according to the embodiment of the present invention as taken along line A-A in FIG. 2.

Details of the inner panel 2 will be described with reference to FIGS. 1 and 4. Referring to FIG. 1, the doorway 3 in the inner panel 2 extends from a floor 1b to a ceiling 1a of the vehicle body 1. The window opening 4 in the inner panel 2 is provided above a middle portion of the inner panel 2 in the upper and lower direction. The pillar forming area 5 of the inner panel 2 extends from the floor 1b to the ceiling 1a of the vehicle body 1. Referring to FIG. 4, the pillar forming area 5 of the inner panel 2 is substantially L-shaped in cross section.

Figure 2:
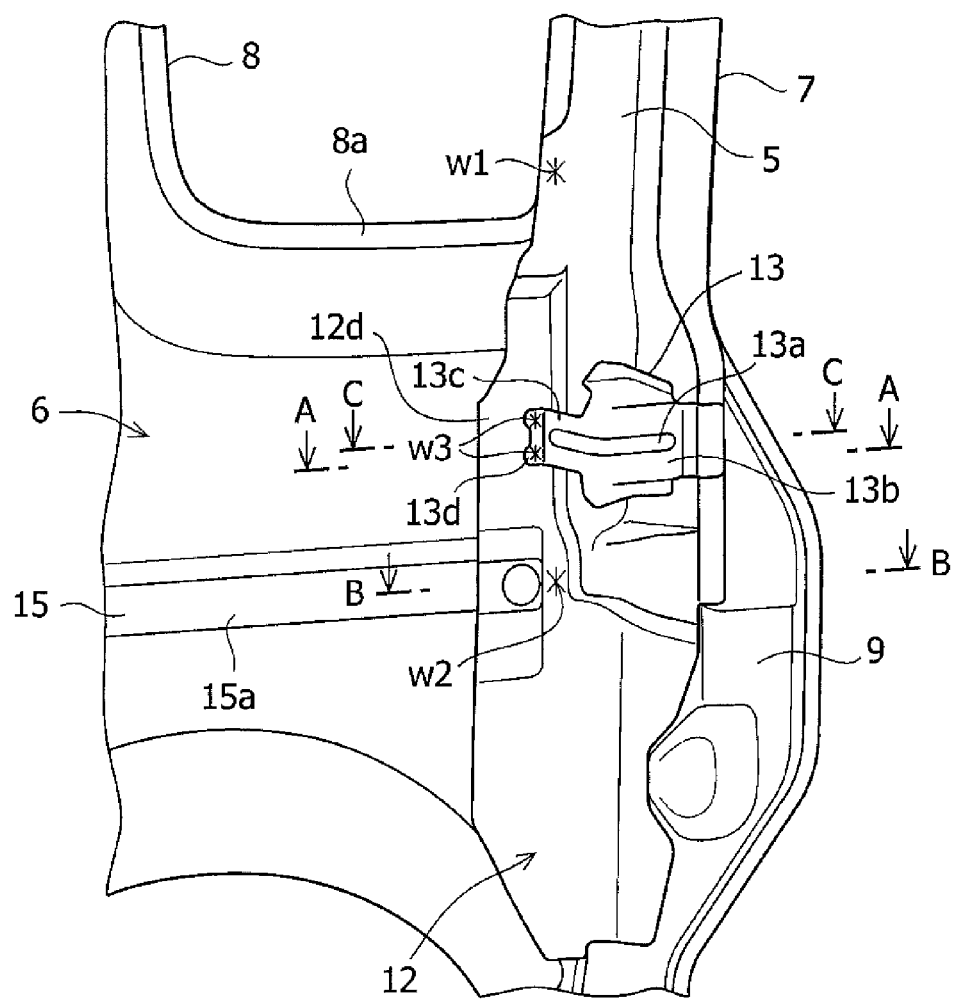
FIG. 2 is a perspective view schematically showing an outer panel, pillar reinforcement, and striker reinforcement used in the embodiment of the present invention as viewed from inside of the vehicle.

Details of the outer panel 6 will be described with reference to FIGS. 1 to 5. Referring to FIG. 1, the doorway 7 in the outer panel 6 extends from the floor 1b to the ceiling 1a of the vehicle body 1. The window opening 8 in the outer panel 6 is provided above middle portion of the outer panel 6 in the upper and lower direction. The pillar forming area 9 of the outer panel 6 extends from the floor 1b to the ceiling 1a of the vehicle body 1. Referring to FIGS. 2 to 5, the pillar forming area 9 of the outer panel 6 is substantially crank-shaped in cross section. The pillar forming area 9 includes: a front portion 9a which is arranged along the vehicle front and rear direction; an intermediate portion 9b which is arranged along the vehicle width direction by extending from a rear end of the front portion 9a; and a rear portion 9c which is arranged along the vehicle front and rear direction by extending from a lateral end of the intermediate portion 9b in the vehicle width direction. The intermediate portion 9b of the pillar forming area 9 extends obliquely rearward from the front portion 9a to the rear portion 9c by sloping outward. Referring to FIGS. 1 and 2, a rail groove 15 configured to guide sliding movement of the sliding door 10 is formed in a location rearward of the pillar forming area 9 of the outer panel 6 with respect to the vehicle and below the window opening 8. The rail groove 15 is formed so as to be depressed from an outer side location in the vehicle width direction toward a center side location in the vehicle width direction and extends along the vehicle front and rear direction.

Details of the sliding door 10 will be described with reference to FIG. 1. The sliding door 10 is formed so as to correspond to the entrance made up of the doorway 3 in the inner panel 2 and the doorway 7 in the outer panel 6. Between a door closing condition in which the entrance is closed and a door opening condition in which the sliding door 10 is located rearward of the rear pillar with respect to the vehicle, the sliding door 10 is configured to slide in the vehicle front and rear direction by being guided by the rail groove 15 in the outer panel 6, and furthermore, the rear pillar is made up of the pillar forming area 5 of the inner panel 2 and pillar forming area 9 of the outer panel 6. Although not specifically illustrated, an engaging member configured to engage with the striker 11 in the door closing condition is installed in middle part, in the upper and lower direction, of a rear end edge of the sliding door 10.

Details of the striker 11 will be described with reference to FIG. 4. The striker 11 is mounted on a front face of the intermediate portion 9b of the pillar forming area 9 of the outer panel 6. The striker 11 having substantially channel-shaped form, includes a pair of leg portions 11a which is spaced away from each other in a horizontal direction, and a front end portion 11b which spans between the pair of leg portions 11a. The leg portions 11a extend from the front face of the intermediate portion 9b of the pillar forming area 9 obliquely outward in a forward direction of the vehicle while the front end portion 11b is arranged parallel to the front face of the intermediate portion 9b of the pillar forming area 9.

Figure 3:
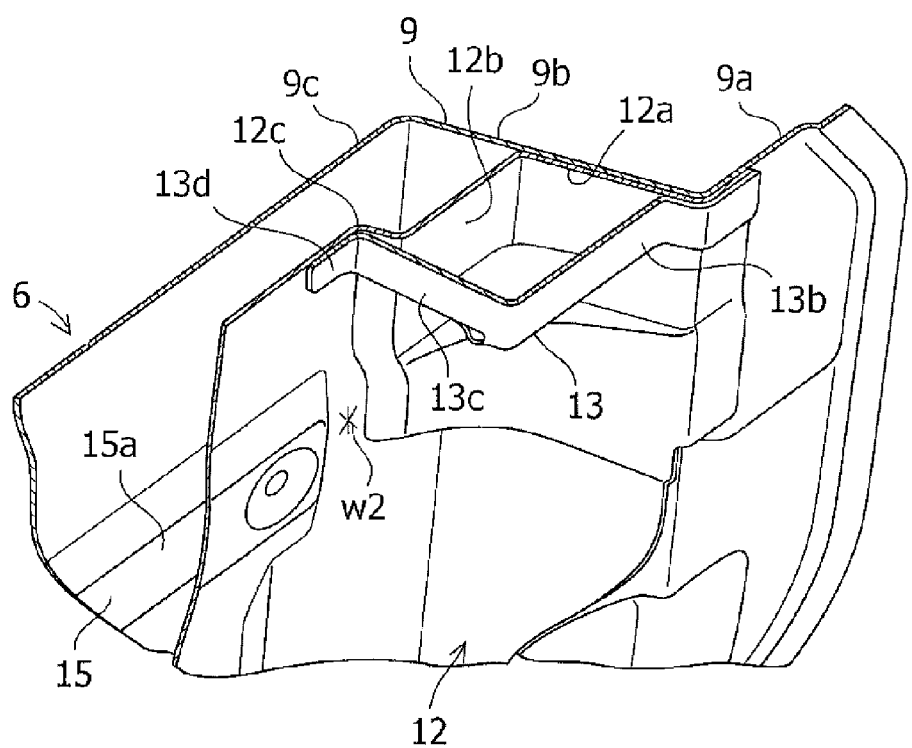
FIG. 3 is a perspective sectional view schematically showing the outer panel, pillar reinforcement, and striker reinforcement used in the embodiment of the present invention as taken along line A-A in FIG. 2.
Figure 5:
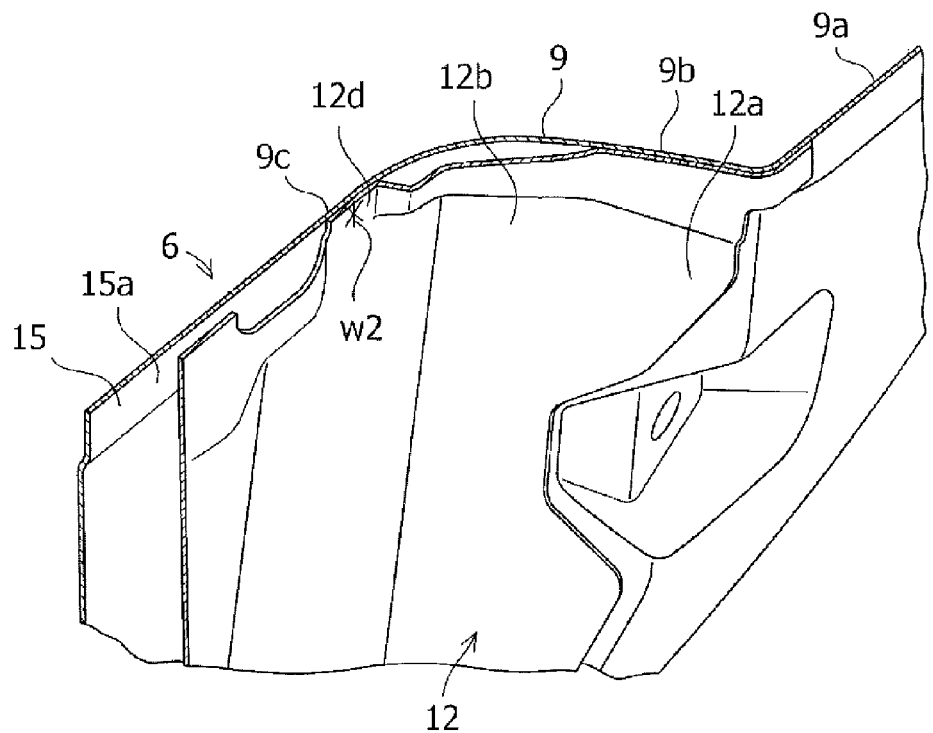
FIG. 5 is a perspective sectional view schematically showing the outer panel, pillar reinforcement, and striker reinforcement used in the embodiment of the present invention as taken along line B-B in FIG. 2.

Details of the pillar reinforcement 12, striker reinforcement 13, and inner panel reinforcement 14 will be described with reference to FIGS. 1 to 6. Referring to FIG. 1, the pillar reinforcement 12 extends from the floor 1*b* to the ceiling 1*a* of the vehicle body 1. Referring to FIGS. 3 to 5, the pillar reinforcement 12 includes a front portion 12*a* and rear portion 12*b*, where the front portion 12*a* is laid over a rear face of the intermediate portion 9*b* of the pillar forming area 9 of the outer panel 6 on which the striker 11 is mounted while the rear portion 12*b* extends toward rear portion of the vehicle from a lateral end of the front portion 12*a* in the vehicle width direction. Referring to FIG. 4, in the rear portion 12*b* of the pillar reinforcement 12, a bent zone 12*c* of a substantially crank-shaped form is installed in middle portion, in the vehicle front and rear direction, of an area around a striker 11 mounting portion, and a flange 12*d* having substantially L-shaped in a cross section is installed at a rear end of the area around the striker 11 mounting portion. Referring to FIGS. 2 and 3, in the rear portion 12*b* of the pillar reinforcement 12, a middle portion between an area above and area below the striker 11 mounting portion in the vehicle front and rear direction, is formed into a linear shape, and the flange 12*d* of a substantially L-shaped in cross section is installed at a rear end of the area above and area below the striker (11) mounting portion in the rear portion 12*b* of the pillar reinforcement 12.

Figure 6:
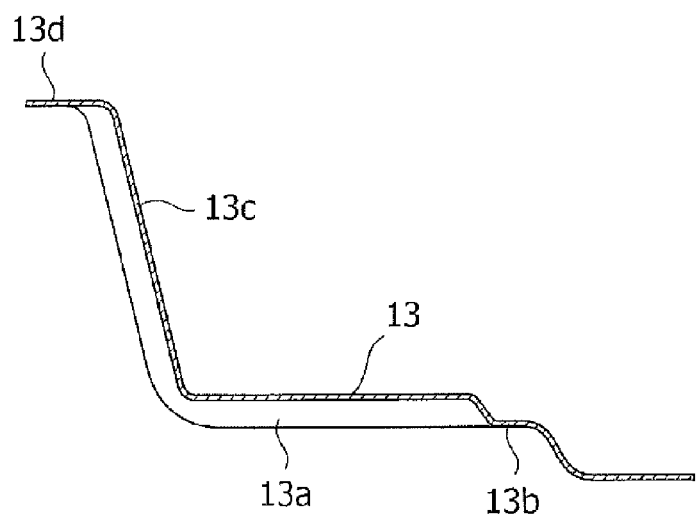
FIG. 6 is a sectional view schematically showing the striker reinforcement used in the embodiment of the present invention as taken along line C-C in FIG. 2.

Referring to FIG. 4, the striker reinforcement 13 is spaced away from the inner panel 2 in the vehicle width direction, and arranged on a rear side of the front portion 12*a* of the pillar reinforcement 12 so as to correspond to the mounting portion for the striker 11. Referring to FIGS. 2 and 6, in order to increase rigidity of the striker reinforcement 13, a bead 13*a* which extends in the vehicle front and rear direction at a center in the upper and lower direction, is arranged on the striker reinforcement 13. The bead 13*a* is formed so as to be depressed from a rear face on the center side in the vehicle width direction toward a surface on the outer side in the vehicle width direction. Referring to FIGS. 3, 4, and 6, the striker reinforcement 13 is substantially L-shaped in a cross section, and is provided with: a front portion 13*b* which is arranged along the vehicle front and rear direction; and a rear portion 13*c* which is arranged along the vehicle width direction. A flange 13*d* having substantially L-shaped form in cross section is installed at a rear end of the striker reinforcement 13.

Referring to FIG. 4, the inner panel reinforcement is arranged across a space on the center side in the vehicle width direction from the striker reinforcement 13. Furthermore, the inner panel reinforcement 14 is substantially L-shaped in cross section, and is provided with a front portion 14*a* which is arranged along the vehicle front and rear direction; and a rear portion 14*b* which is arranged along the vehicle width direction by extending from a rear end of the front portion 14*a*.

Joining of the pillar reinforcement 12 and striker reinforcement 13 will be described with reference to FIGS. 2 to 5. Referring to FIG. 2, above the mounting portion for the striker 11, the flange 12*d* of the pillar reinforcement 12 is laid over a peripheral portion 8*a* of the window opening 8 in the outer panel 6 and the flange 12*d* of the pillar reinforcement 12 and a peripheral portion 8*a* of the window opening 8 in the outer panel 6 are spot welded together at a joint w1. Furthermore, referring to FIGS. 2 to 5, below the mounting portion for the striker 11, the flange 12*d* of the pillar reinforcement 12 is laid over a bottom portion 15*a* of the rail groove 15 in the outer panel 6, and the flange 12*d* of the pillar reinforcement 12 and a bottom portion 15*a* of the rail groove 15 in the outer panel 6 are spot welded together at a joint w2. Referring to FIG. 4, between the bent zone 12*c* and flange 12*d* of the pillar reinforcement 12, the flange 13*d* of the striker reinforcement 13 is laid over the pillar reinforcement 12, and the pillar reinforcement 12 and the flange 13*d* of the striker reinforcement 13 are spot welded together at a joint w3. Incidentally, the joint w1 in the area above the mounting portion for the striker 11 and the joint w2 in the area below the mounting portion for the striker 11 are arranged forward of the joint w3 of the striker reinforcement 13 with respect to the vehicle.

Arrangement of the inner panel 2, the outer panel 6, the pillar reinforcement 12, the striker reinforcement 13, and the inner panel reinforcement 14 in relation to each other will be described with reference to FIG. 4. The outer panel 6 and pillar reinforcement 12 form a closed section. As an example, in the area around the striker 11 mounting portion for the pillar reinforcement 12, a ratio of lengths of the closed section in the front and rear direction and width direction of the vehicle is 2:1 (=length in the front and rear direction:length in the vehicle width direction). The pillar reinforcement 12 and the striker reinforcement 13 form a closed section which is formed in a substantially quadrangular shape. The striker reinforcement 13 is spaced away from the inner panel 2 and inner panel reinforcement 14. The front portion 14*a* of the inner panel reinforcement 14 is arranged over the lateral surface, in the vehicle width direction, of the inner panel 2, and the rear portion 14*b* of the inner panel reinforcement 14 is spaced away from the lateral surface, in the vehicle width direction, of the inner panel 2.

Actions produced by the door holding mechanism (striker 11) and surrounding structure according to the embodiment of the present invention in response to a force F applied externally will be described with reference to FIG. 4. When a force F directed from a center side location in the vehicle width direction toward an outer side location in the vehicle width direction is applied to the striker 11, a force (hereinafter referred to as a "force in a rotation direction") tending to rotate around the mounting portion for the striker while being viewed from above acts on the pillar reinforcement 12. Consequently, a force tending to separate a weld of the outer panel 6 and flange 12*d*, acts on the flange 12*d* on a rear end of the pillar reinforcement 12. At this time, the bent zone 12*c* of the pillar reinforcement 12 deforms, and thereby provides resistance against the force in the rotation direction of the pillar reinforcement 12. Since the striker reinforcement 13 is spaced away from the inner panel 2, the force in the rotation direction of the pillar reinforcement 12 is facilitated, and as a result, the force acting on the pillar reinforcement 12 is scattered. On the other hand, the force acting on the pillar reinforcement 12 is received by the striker reinforcement 13 which forms a closed section in conjunction with the pillar reinforcement 12. This restricts movement of the pillar reinforcement 12 to such a position as to cause the joints w1 and w2 of the outer panel 6 and the flange 12*d* of the pillar reinforcement 12 to be separated.

As described above, according to the embodiment of the present invention, the pillar reinforcement 12 has the substantially crank-shaped bent zone 12*c* in the middle part, in the longitudinal direction, of the rear portion 12*b*, when a force F directed from the center side in the vehicle width direction toward the outer side in the vehicle width direction, is applied to the striker 11, resistance develops against the force (hereinafter referred to as a "force in a rotation direction") tending to rotate the pillar reinforcement 12 around the mounting portion for the striker 11 while being viewed from above, and as a result, the force in the rotation direction is scattered. The force in the rotation direction prevents separation of the joints w1 and w2 of the outer panel 6 and the flange 12*d* of the pillar reinforcement 12. This makes it possible to increase joint strength of the pillar reinforcement 12 around the striker 11 as well as rigidity around the striker 11.

According to the embodiment of the present invention, the joint w1 of the peripheral portion 8a of the window opening 8 in the outer panel 6 and the flange 12d of the pillar reinforcement 12 is arranged above the striker 11, and the joint w2 of the rail groove 15 in the outer panel 6 and the flange 12d of the pillar reinforcement 12 is arranged below the striker 11, the pillar reinforcement 12 deforms in an area stretching from the striker 11 subjected to an external force F to the joints w1 and w2 of the outer panel 6 and the flange 12d of the pillar reinforcement 12, and as a result, the load applied around the striker 11 is scattered efficiently. This makes it possible to increase the rigidity around the striker 11.

According to the embodiment of the present invention, the striker reinforcement 13 is spaced away from the inner panel 2 in the vehicle width direction and arranged on the rear side part of the front portion 12a of the pillar reinforcement 12 so as to correspond to the mounting portion for the striker 11, the pillar reinforcement 12 and the striker reinforcement 13 form a closed section which is formed in a substantially quadrangular shape, and the flange 12d of the pillar reinforcement 12 is spot welded to the outer panel 6. This makes it possible to further increase the rigidity around the striker 11. Since the striker reinforcement 13 is spaced away from the inner panel 2 in the vehicle width direction, rotation of the pillar reinforcement 12 is facilitated, and as a result, the force acting on the pillar reinforcement 12 is scattered. On the other hand, the force acting on the pillar reinforcement 12 is received by the striker reinforcement 13 which forms a closed section in conjunction with the pillar reinforcement 12. This prevents the pillar reinforcement 12 from moving to such a position as to cause the joints w1 and w2 of the outer panel 6 and the flange 12d of the pillar reinforcement 12 to be separated.

According to the embodiment of the present invention, the flange 12d of the pillar reinforcement 12 is spot welded to the high-strength rail groove 15 in the outer panel 6, and as a result, it is possible to increase the joint strength of the outer panel 6 and the flange 12d of the pillar reinforcement 12.

According to the embodiment of the present invention, the flange 12d of the pillar reinforcement 12 is spot welded, in an upper area of the vehicle body 1, to the high-strength peripheral portion 8a of the window opening 8 in the outer panel 6, and as a result, it is possible to increase the joint strength of the outer panel 6 and the flange 12d of the pillar reinforcement 12 in an upper area of the vehicle body 1.

An embodiment of the present invention has been described so far, but the present invention is not limited to the embodiment described above and various modifications and changes can be made based on the technical concept of the present invention.

For example, As a first variation of the present invention, the vehicle body 1 does not necessarily have to be that of a one-box vehicle, and may be that of a station wagon, hatchback, or other vehicle as long as the vehicle body 1 can adopt the sliding door 10.

As a second variation of the present invention, members may be joined by gas welding, arc welding, TIG welding, plasma welding, self-shielded arc welding, electroslag welding, electron beam welding, laser beam welding, projection welding, seam welding, upset welding, flash welding, butt-seam welding, soldering, or brazing and others instead of spot welding. Also, fastening members such as screws or bolts and others may be used instead of spot welding.

As a third variation of the present invention, a hook-shaped member engageable with the engaging member of the sliding door 10 may be used as a door holding mechanism instead of the striker 11.

As a fourth variation of the present invention, only one of the joints may be installed: specifically, the joint w1 of the peripheral portion 8a of the window opening 8 in the outer panel 6 and the flange 12d of the pillar reinforcement 12 or the joint w2 of the rail groove 15 in the outer panel 6 and the flange 12d of the pillar reinforcement 12.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A surrounding structure of a door holding mechanism including:
   an outer panel being arranged on an outer side location of a vehicle in a vehicle width direction, the outer panel forming a pillar together with an inner panel;
   a sliding door configured to open and close by sliding in a vehicle front and rear direction in a location rearward of the pillar; and
   a door holding mechanism configured to hold a rear end portion of the sliding door in a closing condition of the sliding door;
   wherein a pillar forming area of the outer panel has a substantially crank-shaped form in a cross section;
   wherein the door holding mechanism is attached to a front face of an intermediate portion of the pillar forming area, and the intermediate portion is arranged along the vehicle width direction;
   wherein a pillar reinforcement is arranged between the outer panel and the inner panel;
   wherein the pillar reinforcement includes a front portion and a rear portion, the front portion is overlapped with a rear face of the intermediate portion of the pillar forming area, the rear face is opposed to the front face of the intermediate portion of the pillar forming area and the door holding mechanism is attached to the front face, and the rear portion extends toward the rear portion of the vehicle from a lateral end, in the vehicle width direction, of the front portion;
   wherein the rear portion of the pillar reinforcement has a substantially crank-shaped form in a middle part thereof in a longitudinal direction thereof;
   wherein the pillar forming area and the pillar reinforcement form a closed section;
   wherein a rear end of the pillar reinforcement is joined to the outer panel along a joint portion;
   wherein a door holding mechanism reinforcement has a cross section which is formed in a substantially L-shaped form, the door holding mechanism reinforcement is arranged on a rear side part of the front portion of the pillar reinforcement so as to correspond to a mounting portion for the door holding mechanism, and the door holding mechanism reinforcement is spaced away from the inner panel in the vehicle width direction;
   wherein the pillar reinforcement and the door holding mechanism reinforcement form a closed section which is formed in a substantially quadrangular shape;
   wherein a flange has a cross section which is formed in a substantially L-shaped form, and the flange is formed at the rear end of the pillar reinforcement; and
   wherein the joint portion in which the outer panel is joined to the rear end of the pillar reinforcement includes a joint part in which the outer panel is joined to the flange.

2. The surrounding structure of a door holding mechanism according to claim 1, wherein
- a window opening of a side window of the vehicle is arranged rearward of the pillar forming area of the outer panel, and
- the joint portion in which the outer panel is joined to the rear end of the pillar reinforcement includes a joint part in which a peripheral portion of the window opening is joined to the rear end of the pillar reinforcement.

3. The surrounding structure of a door holding mechanism according to claim 1, wherein
- a bead which extends in the vehicle front and rear direction at a center, in the upper and lower direction, of the striker reinforcement, is arranged on the striker reinforcement, and
- the bead is formed so as to be depressed in a direction from a center, in the vehicle width direction, of the vehicle toward an outer end, in the vehicle width direction, of the vehicle.

4. The surrounding structure of a door holding mechanism according to claim 1, wherein
- a rail groove is configured to guide sliding movement of the sliding door, and the rail groove is depressed from the outer side location in the vehicle width direction toward a center side location in the vehicle width direction,
- the rail groove is arranged along the vehicle front and rear direction in a region rearward of the pillar forming area of the outer panel, and
- the joint portion in which the outer panel is joined to the rear end of the pillar reinforcement includes a joint part in which the rail groove is joined to the rear end of the pillar reinforcement.

5. The surrounding structure of a door holding mechanism according to claim 4, wherein
- a window opening of a side window of the vehicle is arranged rearward of the pillar forming area of the outer panel, and
- the joint portion in which the outer panel is joined to the rear end of the pillar reinforcement includes a joint part in which a peripheral portion of the window opening is joined to the rear end of the pillar reinforcement.

6. The surrounding structure of a door holding mechanism according to claim 1, wherein
- the joint portion in which the outer panel is joined to the rear end of the pillar reinforcement is arranged in at least one of locations above and below the door holding mechanism.

7. The surrounding structure of a door holding mechanism according to claim 6, wherein
- a window opening of a side window of the vehicle is arranged rearward of the pillar forming area of the outer panel, and
- the joint portion in which the outer panel is joined to the rear end of the pillar reinforcement includes a joint part in which a peripheral portion of the window opening is joined to the rear end of the pillar reinforcement.

8. The surrounding structure of a door holding mechanism according to claim 6, wherein
- a rail groove is configured to guide sliding movement of the sliding door, and the rail groove is depressed from the outer side location in the vehicle width direction toward a center side location in the vehicle width direction,
- the rail groove is arranged along the vehicle front and rear direction in a region rearward of the pillar forming area of the outer panel, and
- the joint portion in which the outer panel is joined to the rear end of the pillar reinforcement includes a joint part in which the rail groove is joined to the rear end of the pillar reinforcement.

9. The surrounding structure of a door holding mechanism according to claim 8, wherein
- a window opening of a side window of the vehicle is arranged rearward of the pillar forming area of the outer panel, and
- the joint portion in which the outer panel is joined to the rear end of the pillar reinforcement includes a joint part in which a peripheral portion of the window opening is joined to the rear end of the pillar reinforcement.

* * * * *